July 3, 1962 | E. F. HAMILTON | Re. 25,195

FOLDABLE PLAY PEN

Original Filed May 5, 1958 | 2 Sheets-Sheet 1

INVENTOR.
EARL F. HAMILTON,
BY
Schley, Fack & Jenkins
ATTORNEYS.

FOLDABLE PLAY PEN
Original Filed May 5, 1958 2 Sheets-Sheet 2
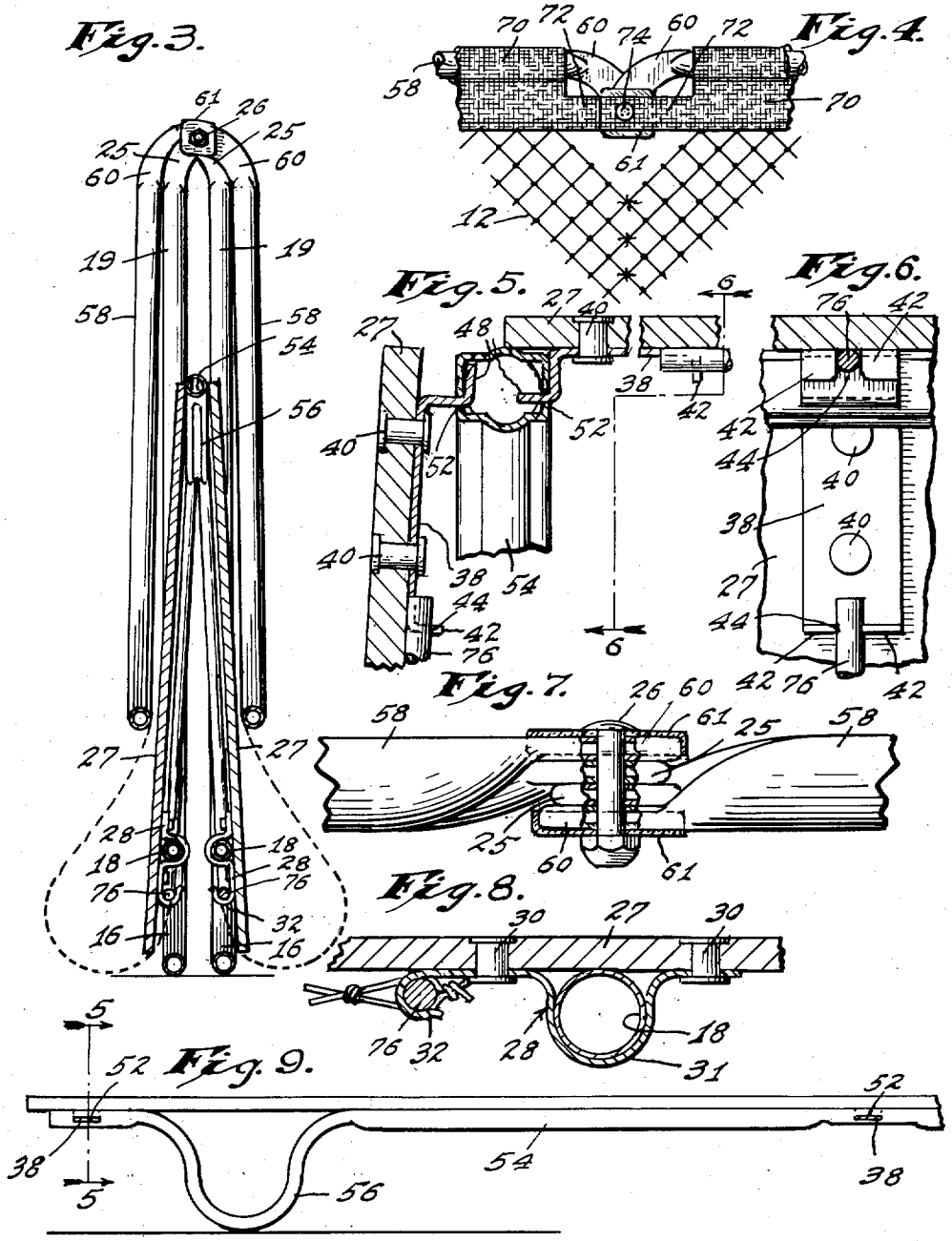
INVENTOR.
EARL F. HAMILTON,
BY
Schley, Zook & Jenkins
ATTORNEYS.

United States Patent Office

Re. 25,195
Reissued July 3, 1962

25,195
FOLDABLE PLAY PEN

Earl F. Hamilton, Columbus, Ind., assignor to Hamilton Cosco, Inc., a corporation of Indiana Original No. 2,991,486, dated July 11, 1961, Ser. No. 733,038, May 5, 1958. Application for reissue Nov. 24, 1961, Ser. No. 155,258
8 Claims. (Cl. 5—98)

Matter enclosed in heavy brackets [ ] appears in the original patent but forms no part of this reissue specification; matter printed in italics indicates the additions made by reissue.

This invention relates to an infant's play pen, and more particularly to a foldable infant's play pen.

It is an object of my invention to provide a play pen which can be economically constructed largely from metal-tubing and fabric netting, and which will prove sturdy and durable in use. A further object of my invention is the provision of a play pen which may be readily folded and unfolded as desired but which may be releasably maintained in unfolded extended position.

In carrying out my invention in its preferred form, I provide a pair of interconnected generally U-shaped leg-forming frames *desirably* [desiraby] formed from lengths of metal-tubing and adapted to be pivoted in the plane of the transverse axis of the play pen between a collapsed storage position and an extended position in which said frames support the play pen in operative position. A floor, desirably formed in two sections, is pivotally mounted on said frames adjacent their lower ends. The sections are pivotally interconnected to another leg member adapted to support the center of said floor when the pen is in extended position. By employing such a pivotal floor and frame construction, said floor is extended during extension of the leg-forming frames and folded into a retracted storage position upon pivotal movement of the frames to their folded storage position.

An upper rail, conveniently in the form of two U-shaped frames, and constituting the upper support for the play pen side walls is pivotally interconnected to the leg-forming frames and is movable from an extended position in which it is disposed in a plane parallel to the floor, and at an angle to the leg-forming frames, to a folded position in which each of the rail frames lies in a plane substantially parallel to the folded floor and leg-forming frames. Side walls desirably formed from a flexible netting are secured to the rail along their upper margins and to the floor at their lower margins. By forming the side walls of a flexible material the rail may be folded into a collapsed storage position in which each of the rail frames is disposed substantially parallel to the collapsed floor and leg-forming frames. Conveniently, the rail is further connected to the leg-forming frames by a plurality of braces which releasably maintain the pen in an unfolded extended position.

Other features of an illustrative embodiment of my invention will be apparent from the more detailed description which follows and from the drawings in which:

FIG. 3 is a vertical section of the play pen shown in FIG. 1 but showing the pen in collapsed position;

FIG. 4 is a fragmental side elevation of the pivotal rail mounting;

FIG. 5 is a sectional view taken on the line 5—5 of FIG. 9 and showing the floor panels in extended and collapsed positions;

FIG. 6 is a vertical section taken on the line 6—6 of FIG. 5;

FIG. 7 is a fragmental plan view in partial section showing the pivotal leg and rail connections;

FIG. 8 is an enlarged vertical section of one of the leg-holding clips;

FIG. 9 is a fragmental side elevation of the fifth pen leg; and

Figure 1:
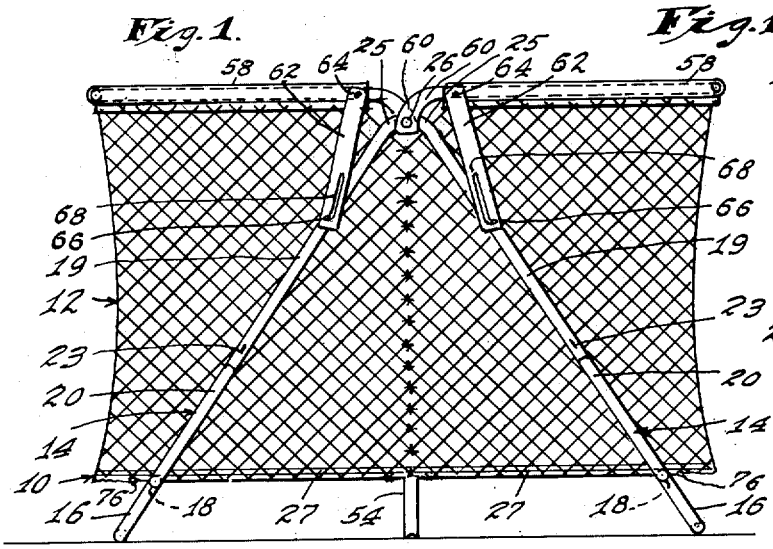
FIG. 1 is an end elevation of a play pen embodying my invention.

The play pen illustrated in the drawings comprises a floor 10 and side walls 12 supported on ground-engaging legs 14. The legs 14 constitute the parallel legs of two U-shaped lengths of metal tubing whose bight portions extend below the level of the floor 10 and are bent downwardly to form ground-engaging feet 16 at the lower ends of the legs 14. The pair of feet 16 on each of the leg-forming frames are interconnected by the horizontal stretch 18 of each of said frames which engages and supports the floor 10 when the pen is in extended position.

Figure 10:
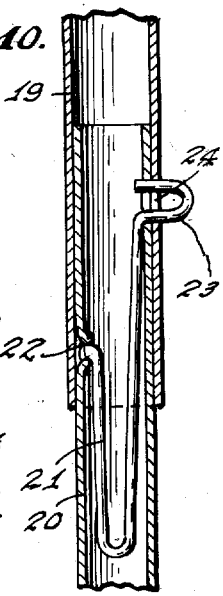
FIG. 10 is a fragmental section showing a method of interconnecting the upper and lower sections of the leg-forming frames.
Figure 2:
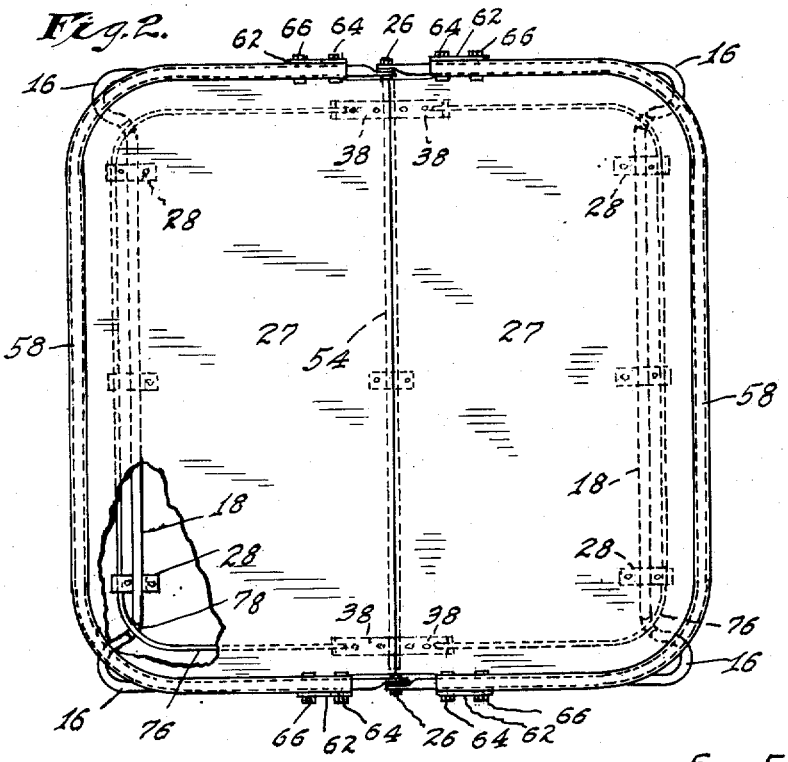
FIG. 2 is a plan view of the play pen shown in FIG. 1 with parts thereof being broken away.

Conveniently, in order that the leg-forming frames 14 may be disassembled for more compact storage and/or shipping, each of said frames may be formed from two interfitting telescoping sections. To this end, each of the leg-forming frames is desirably formed with a pair of upper section 19 into which the ends of a lower frame section 20 are received, as shown in FIG. 10. Said upper and lower sections may be releasably locked together in any convenient manner, but we prefer to use the locking means shown in FIG. 10 where a generally U-shaped spring wire 21 is secured within the lower section adjacent each of its ends by having one of the ends of the wire bent outwardly for reception in an opening 22 cut in said lower section. The opposite end of the wire 21 is bent to form a lug 23 adapted to project outwardly under the spring tension of the wire through openings 24 formed in the telescoping walls of the upper and lower frame sections to lock said sections in assembled relation.

The upper end of each of the legs 14 is flattened and bent as at 25 so that the ends of the adjacent legs on the leg-forming frames overlap for pivotal interconnection by bolts 26 extending through holes formed in the flattened ends 25. In this manner the two leg-forming frames can be pivoted about the transverse axis of the pen to dispose the legs 14 in a diverging extended position shown in FIG. 1, and in a collapsed storage position in which the legs 14 lie in adjacent substantially parallel planes, as shown in FIG. 3.

The floor 10 conveniently comprises a pair of identical generally rectangular panels 27 of rigid material, such as Masonite. As shown in FIG. 8, each of the panels 27 is pivotally mounted on one of the leg-forming frames by clips 28 mounted on its lower face adjacent the lateral margin thereof. Each of the clips 28 is secured to one of the panels 27 by a pair of rivets 30 and comprises a downwardly extending loop 31 formed adjacent its inner end and a small inwardly open detent 32 formed at its opposite or outer end. The horizontal stretches 18 of the leg-forming frames are received in the loops 31 to pivotally connect the flooring panels 27 to said frames.

A second set of clips 38 is mounted along the inner marginal edges of the panels 27 as by rivets 40. As shown, each of the clips 38 comprises a downturned lip 42 at its outer end provided with an opening 44 formed at the base of said lip. The opposite end of each clip comprises a tongue 48 receivable in a slot 52 cut in a fifth tubular leg 54 extending transversely across the pen below the adjacent margins of the flooring panels.

Conveniently, the leg 54 is formed from a length of metal tubing bent downwardly adjacent its ends to form ground-engaging feet 56 similar to the feet 16. The leg 54 is bent further at each of the slots 52 to provide a generally rectangular cross-section which limits the arc through which the tongues 48 may pivot during collapse and extension of the pen. As shown, when the pen is in extended position with the flooring panels 27 disposed in a common horizontal plane the adjacent margins of the panels will rest on, and be supported by, the upper face of the leg 54, and upon collapse of the pen the panels 27 *pivot* [piovt] about the frame stretches 18 and the leg 54 to lie in adjacent parallel planes with the leg 54 disposed therebetween. As will be understood, by deforming the leg 54 into a generally rectangular cross-section in the area of the slots 52 a broad panel-supporting surface will be provided for supporting the adjacent margins of the panels 27 when the pen is in extended position.

As shown in FIG. 1, the side walls 12 are supported from a rail 58 formed from a pair of U-shaped lengths of metal tubing. The ends of each of said lengths are flattened and bent as at 60 so that they may be overlapped and pierced for the reception of the bolts 26. In this preferred construction, the two leg-forming frames and the two rail sections are pivoted about the bolts 26 on the transverse axis of the pen. Conveniently, a cover 61 formed from any desired material such as plastic, rubber, or the like, may be fit over the flattened ends of the rail sections and held thereon as by the bolts 26.

The rail sections are stabilized both in extended and collapsed position by braces 62 interconnecting each of the legs 14 to the rail 58. The upper end of each of the braces 62 is pivotally mounted on the rail 58 by a bolt 64 and the lower end is connected to one of the legs 14 by a bolt 66 mounted on the leg and slidable in a longitudinally extending slot 68 formed in the brace. The lower end of the slot 68 is formed in a manner to constitute a hook into which the bolt 66 is received upon extension of the rail 58 and the legs 14 for releasably locking said rail and legs in extended position.

Extending between the rail 58 and the floor 10 are pen enclosing side walls 12 conveniently formed from lengths of flexible material, such as a net, preferably of a synthetic fiber, tied together at their ends to constitute a single length of netting forming the side walls. Conveniently, the upper end of the walls 12 is provided with a casing 70 of plastic, cloth, or the like, received around the rail 58. To prevent the casing 70 from interfering with the pivotal movement of the rail sections, it is formed in two lengths with each of said lengths mounted on one of the rail sections and secured thereon by the bolts 64. Each of the casing lengths has a pair of tabs 72 provided with snaps 74 adapted to lock with a corresponding pair of snaps and tabs on the other hem section to releasably hold the two casing sections together between the pairs of adjacent bolts 64.

The lower margin of the net side walls 12 extends downwardly over the marginal edge of the floor 10 and is secured to the lower face thereof by U-shaped wire loops 76 interwoven between the strands of netting. To hold the loops 76 in association with the floor 10, the ends of the loops are inserted into the openings 44 of the lips 42 on the clips 38 and the bights of the loops are sprung inward for reception in the clip detents 32. When the springing effect is released, the resiliency of the loops causes said loops to resume their original shape to form a substantially continuous connection between the walls 12 and the floor 10 adjacent the marginal edge of the floor. Conveniently, the horizontal stretches 18 of the leg-forming frames are recessed, as at 78, so that upon collapse of the pen the loops 76 will enter said recesses and permit the horizontal stretches and feet of the frames to abut the lower floor face and thereby effect a complete collapse of the floor and leg-forming frames.

Extension of the play pen from its collapsed storage position (FIG. 3) to an extended operative position (FIG. 1) may be effected by pivotally separating the two leg-forming frames about the axes of the bolts 26 so that the pairs of legs 14 diverge to form a broad ground-engaging base. This extension causes the two flooring panels 27 to pivot about the fifth leg 54 and the horizontal stretches 18 until the panels lie in a common horizontal plane with their adjacent inner margins resting on, and being supported by, the leg 54. The two pivotal rail frames are then raised until they lie in a common plane parallel to the floor 10. During this rail movement the slot 68 moves upwardly with respect to the bolt 66 until said bolt is disposed in the hooked lower end of said slot thereby releasably locking the legs 14 and the rail 58 in extended positions and cross-bracing the rail with each leg 14. Extension of the rail 58 erects the side walls 12 with the netting constituting such side walls being stretched between the rail 58 and the loops 76. In this stretched position, the walls are prevented from pulling out at the bottom by the inwardly directed detent 32 engaging the loops 76.

As will be understood, collapse of the play pen may be readily effected by reversing the pivotal movements of the pen components previously described in connection with the extension of the play pen. In such a collapsed position, the pair of rail sections, the flooring panels and the two leg-forming frame will be disposed in adjacent substantially parallel planes, as shown in FIG. 3. By employing this novel foldable construction, a conventional flexible play pen pad covering the floor 10 may be folded with the play pen and thereby obviate its removal as is necessary in other foldable play pen constructions. Further, when my pen is disposed in collapsed position the flexible side walls 12 hang downwardly from the rail 58 and the floor 10 to form bags or pouches for holding toys or other objects that may be in the pen.

The netting side walls 12 will remain taut and tightly stretched between the rail 58 and the floor 10 under normal conditions of use. It is possible, however, that under extreme conditions of use the side walls 12 may become stretched and sag. In this event, the loops 76 can be removed from the clips 28 and 38 and rewoven in the netting strands to reduce the amount of netting disposed between the loops and the rail 58.

I claim as my invention:

1. A play pen, comprising a pair of leg-forming frames pivotally interconnected at their upper ends and movable between extended and collapsed positions, a cross-member adjacent the lower end of each of said frames connecting the opposed sides thereof, a pair of rigid floor panels of equal width pivotally mounted on said cross-members adjacent the remote ends of said panels, a ground-engaging support [interconnecting] *pivotally connected to* the adjacent ends of said floor panels to provide [a pivotal axis for said floor panels] for collapse and extension of said floor panels with said frames and supporting the adjacent ends of said panels along substantially their entire length when they are in extended position, a pair of foldable rails pivotally interconnected to said leg-forming frames and supporting flexible side walls disposed between said rails and the floor panels, and a plurality of braces interconnecting each of said rails to one of the leg-forming frames for releasably maintaining said rails in an extended position and allowing said rails to be folded and extended independently of the leg-forming frames and floor panels.

2. A play pen, comprising a pair of leg-forming frames pivotally interconnected at their [upped] *upper* ends and movable between extended and collapsed positions, a pair of rigid floor panels pivotally mounted on said leg-forming frames, hinge means on said floor panels interconnecting their adjacent ends to support the same in extended position and providing [a pivotal axis for said adjacent ends on the transverse axis of the pen] for collapse and extension of said floor panels with said frames, a pair of foldable rails pivotally interconnected to said leg-forming frames, flexible side walls secured at their upper margins to said rails and at their lower margins to a pair of metal-loops removably mounted on the lower face of said floor panels inwardly from the marginal edges thereof, the adjacent ends of said loops being releasably retained in position by said hinge means and the remote ends of said pair of loops being releasably maintained in position by the pivotal mounting of the floor panels on the leg-forming frames, and means independently connecting each of said rails to one of the leg-forming frames above the plane of the floor panels for releasably maintaining each of said rails in an extended position.

3. A play pen as set forth in claim 2 in which said side walls are a continuous length of fabric netting with said pair of loops being interwoven between the netting strands at the lower margins of the side walls and spring-stressed into operative position on the lower face of said floor panels.

4. A play pen, comprising a pair of leg-forming frames each having a pair of legs connected by a cross-member adjacent their lower ends, said frames being pivotally interconnected at their upper ends and movable between extended and collapsed positions, a floor including a pair of rigid panels of equal width pivotally mounted on said cross-members adjacent the remote ends of said panels, an elongated ground-engaging support pivotally *connected to* [interconnecting] the floor panels at their adjacent edges and engageable with the lower faces of said floor panels in face-to-face contact substantially along its entire length when the floor is in its extended position for supporting the central portion thereof, said support being retractable from its ground-engageable position by said floor panels upon collapse of the leg-forming frames, a pair of foldable rails pivotally interconnected to said leg-forming frames and supporting flexible side walls disposed between said rails and the floor, and means cross-bracing said rails and the leg-forming frames above the plane of the cross-members on said frames for releasably maintaining said rails in extended positions independently of each other.

5. A play pen as set forth in claim 4 in which said support comprises a length of metal-tubing extending along a transverse axis of the play pen and having a flattened upper face, said tubing being bent to form a plurality of longitudinally spaced ground-engageable feet.

6. A play pen, comprising a pair of leg-forming frames pivotally interconnected at their upper ends and movable between extended and collapsed positions, each of said leg-forming frames including a pair of parallel ground-engaging legs interconnected adjacent their lower ends by a horizontal stretch, a pair of rigid floor panels of equal width [pivotally] *foldably* connected at their adjacent ends and pivotally mounted adjacent their remote ends on the horizontal stretches of said leg-forming frames whereby said floor panels are collapsed and extended upon collapse and extension of said frames, a pair of foldable rails pivotally interconnected to the upper ends of said leg-forming frames and supporting flexible side walls disposed between said rails and the floor panels, and bracing means independently connecting each of said rails to one of the leg-forming frames for releasably maintaining said rails in an extended position, each of said legs being telescopically adjustable between its connection to said bracing means and said horizontal stretch for adjusting the distance between the floor panels and said pair of foldable rails.

7. A play pen, comprising a pair of leg-forming frames pivotally connected at their upper ends and movable between extended and collapsed position, said frames in extended position diverging outwardly from their upper ends along opposite sides of the pen to provide a broad ground-engaging base and in collapsed position lying in adjacent substantially parallel planes, a pair of rigid floor panels of equal width pivotally connected to said frames adjacent their remote ends, the inner ends of said floor panels being pivotally connected to a ground-engageable support to support the central portion of the play pen floor formed by said panels and to cause said floor panels to move between collapsed and extended position upon movement of the leg frames between collapsed and extended positions, a pair of foldable upper rails supporting flexible side walls disposed between said upper rails in the floor panels, said upper rails being pivotally connected to the upper ends of the leg-forming frames and foldable to a collapsed position abutting said leg-forming frames and locking means on each of said upper rails for releasably locking said rails in extended position independently of each other, said locking means extending between points adjacent the connection of the upper rails to the leg-forming frames and points on said leg-forming frames above their connections to the floor panels.

8. A play pen as set forth in claim 7 in which the pivotal axes of the upper rails, the leg-forming frames, and the floor panels lie in [a common vertical plane on] *closely adjacent vertical planes adjacent* the transverse axis of the play pen.

References Cited in the file of this patent or the original patent

UNITED STATES PATENTS

| | | |
|---|---|---|
| 520,699 | Neal | May 29, 1894 |
| 609,520 | De Von | Aug. 23, 1898 |
| 773,500 | Hizer | Oct. 25, 1904 |
| 1,157,453 | Szinak | Oct. 19, 1915 |
| 1,158,507 | Kolb | Nov. 2, 1915 |
| 1,528,129 | Phillips | Mar. 3, 1925 |
| 1,795,697 | Abela | Mar. 10, 1931 |
| 1,807,234 | Brown | May 26, 1931 |
| 1,837,537 | Emerson | Dec. 22, 1931 |
| 2,563,915 | Boisselier | Aug. 14, 1951 |
| 2,710,976 | Martensen | June 21, 1955 |
| 2,783,053 | Sheldrick | Feb. 26, 1957 |
| 2,790,978 | Tigrett | May 7, 1957 |
| 2,809,382 | Jackson | Oct. 15, 1957 |
| 2,851,701 | Lukala | Sept. 16, 1958 |
| 2,908,021 | Fulton | Oct. 13, 1959 |
| 2,922,169 | Werner | Jan. 26, 1960 |

FOREIGN PATENTS

| | | |
|---|---|---|
| 3,332 | Great Britain | of 1833 |
| 19,252 | Great Britain | of 1892 |
| 182,631 | Great Britain | July 13, 1922 |
| 640,023 | France | Mar. 19, 1928 |
| 461,345 | Germany | June 18, 1928 |
| 768,344 | France | May 14, 1934 |
| 958,555 | France | Sept. 12, 1949 |